US007092881B1

(12) United States Patent
Aguilar et al.

(10) Patent No.: US 7,092,881 B1
(45) Date of Patent: Aug. 15, 2006

(54) PARAMETRIC SPEECH CODEC FOR REPRESENTING SYNTHETIC SPEECH IN THE PRESENCE OF BACKGROUND NOISE

(75) Inventors: Joseph Gerard Aguilar, Princeton, NJ (US); Juin-Hwey Chen, Neshanic Station, NJ (US); Wei Wang, Plainsboro, NJ (US); Robert W. Zopf, Lawrenceville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1154 days.

(21) Appl. No.: 09/625,960

(22) Filed: Jul. 26, 2000

Related U.S. Application Data

(60) Provisional application No. 60/145,591, filed on Jul. 26, 1999.

(51) Int. Cl.
*G10L 15/20* (2006.01)

(52) U.S. Cl. ...................................... 704/233; 704/207

(58) Field of Classification Search ................ 704/233, 704/207, 208, 214, 219
See application file for complete search history.

(56) References Cited

U.S. PATENT DOCUMENTS 5,699,477 A * 12/1997 McCree ...................... 704/216
5,765,127 A * 6/1998 Nishiguchi et al. ......... 704/208
5,774,837 A 6/1998 Yeldener et al.
5,787,387 A 7/1998 Aguilar
5,878,388 A * 3/1999 Nishiguchi et al. ......... 704/214
5,960,388 A * 9/1999 Nishiguchi et al. ......... 704/208
6,078,880 A * 6/2000 Zinser et al. ............... 704/208
6,094,629 A * 7/2000 Grabb et al. ................ 704/219
6,370,500 B1 * 4/2002 Huang et al. ............... 704/208
6,418,407 B1 * 7/2002 Huang et al. ............... 704/207
6,463,406 B1 * 10/2002 McCree ...................... 704/207
6,493,664 B1 * 12/2002 Udaya Bhaskar et al. .. 704/222
6,507,814 B1 * 1/2003 Gao .......................... 704/220
6,526,376 B1 * 2/2003 Villette et al. ............. 704/207
6,691,092 B1 * 2/2004 Udaya Bhaskar et al. .. 704/265

OTHER PUBLICATIONS

*Speech Coding and Synthesis*, by R. J. McAulay and T. F. Quatieri, 1995 Elsevier Science B.V.
*Introduction to Artificial Neural Systems*, by Jacek M. Zurada, Copyright 1992 by West Publishing Company.
*Speech Coding and Synthesis*, by R. J. McAulay and T. F. Quatieri, 1995 Elsevier Science B.V., no month or day.
*Introduction to Artificial Neural Systems*, by Jacek M. Zurada, Copyright 1992 by West Publishing Company, no month or day.

* cited by examiner

*Primary Examiner*—W. R. Young
*Assistant Examiner*—Michael N. Opsasnick

(57) ABSTRACT

A system and method are provided for processing audio and speech signals using a pitch and voicing dependent spectral estimation algorithm (voicing algorithm) to accurately represent voiced speech, unvoiced speech, and mixed speech in the presence of background noise, and background noise with a single model. The present invention also modifies the synthesis model based on an estimate of the current input signal to improve the perceptual quality of the speech and background noise under a variety of input conditions. The present invention also improves the voicing dependent spectral estimation algorithm robustness by introducing the use of a Multi-Layer Neural Network in the estimation process. The voicing dependent spectral estimation algorithm provides an accurate and robust estimate of the voicing probability under a variety of background noise conditions. This is essential to providing high quality intelligible speech in the presence of background noise.

37 Claims, 14 Drawing Sheets

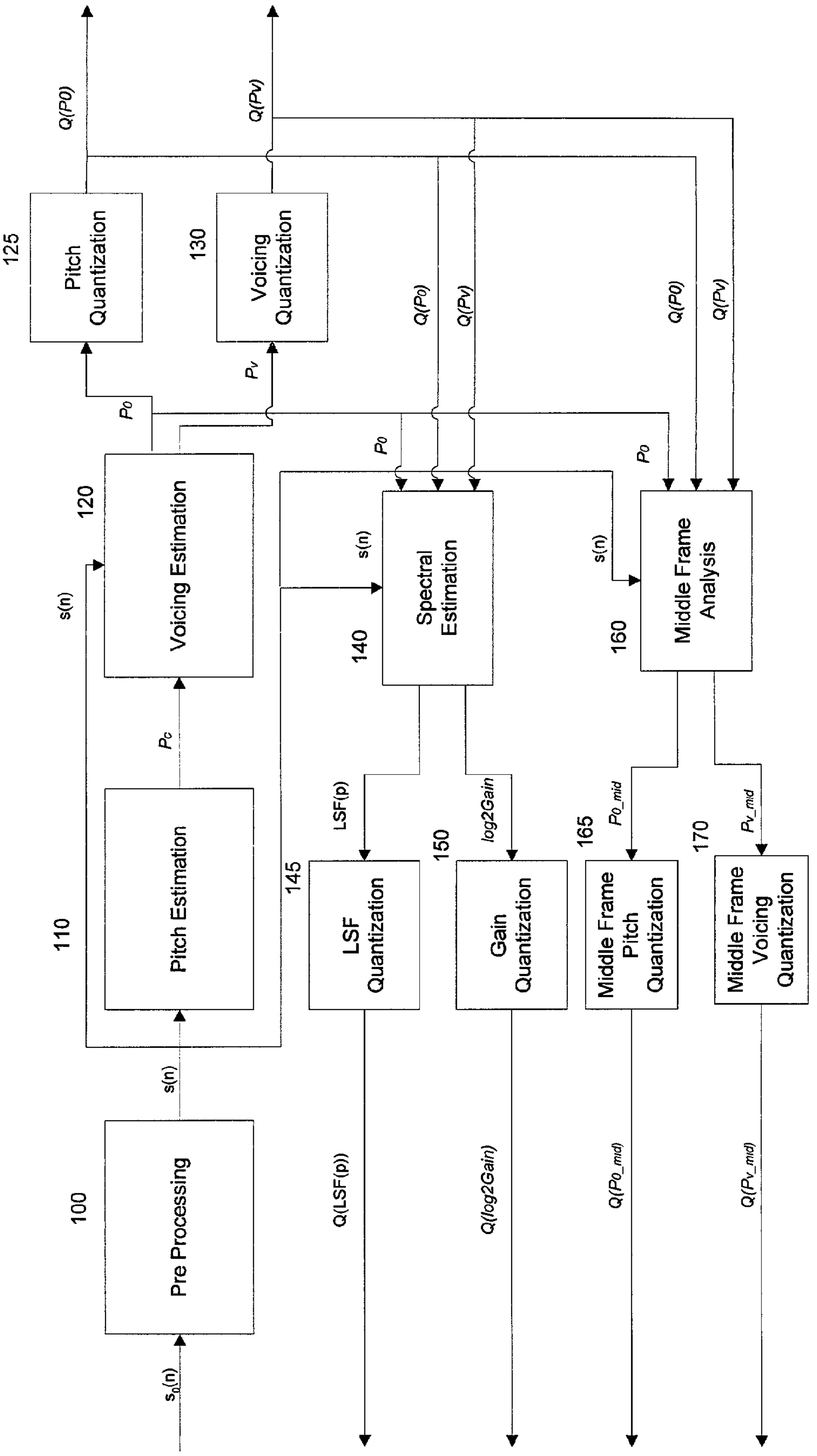
Figure 1. Encoder Overview

Figure 2 : Decoder Overview
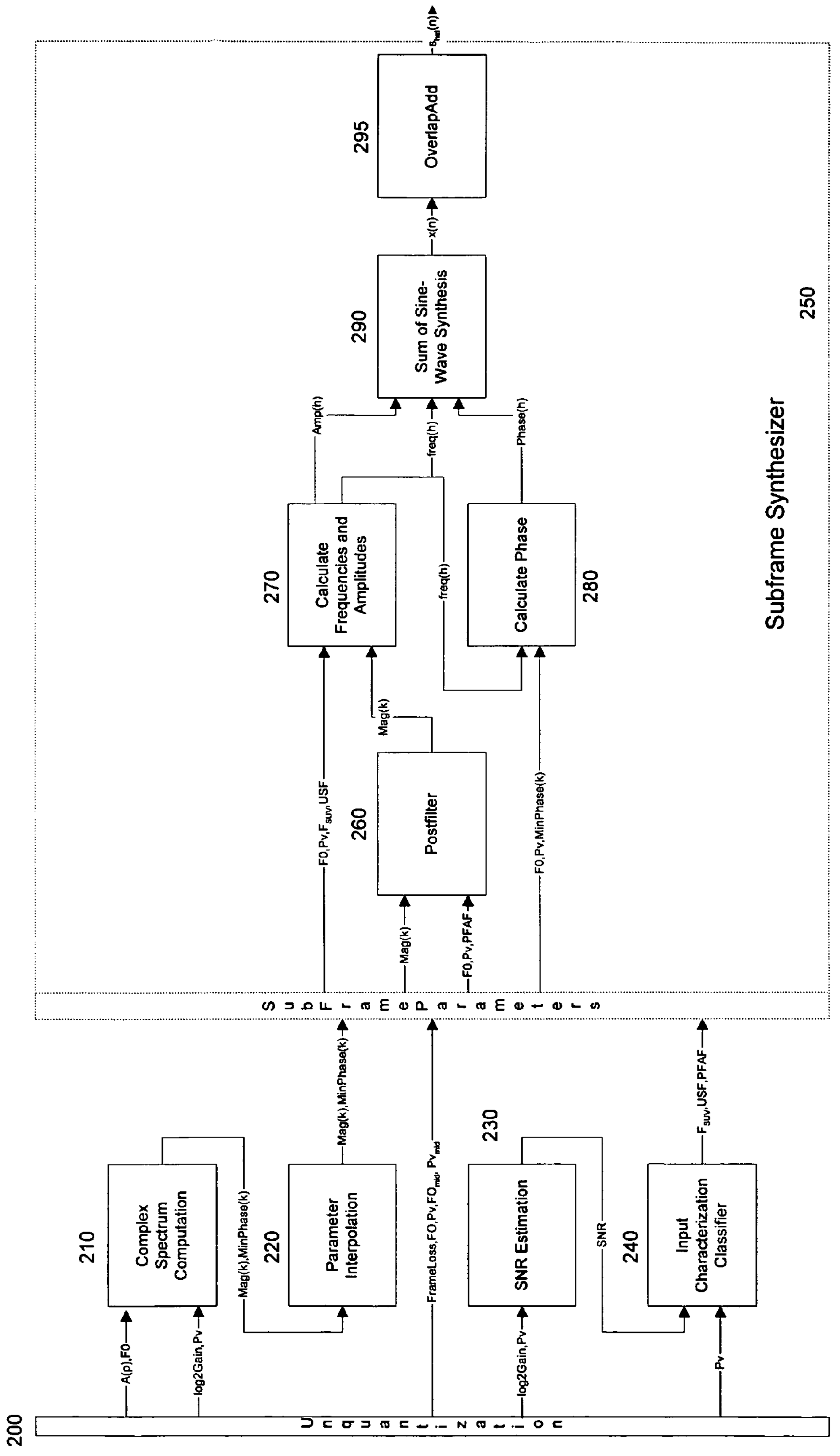

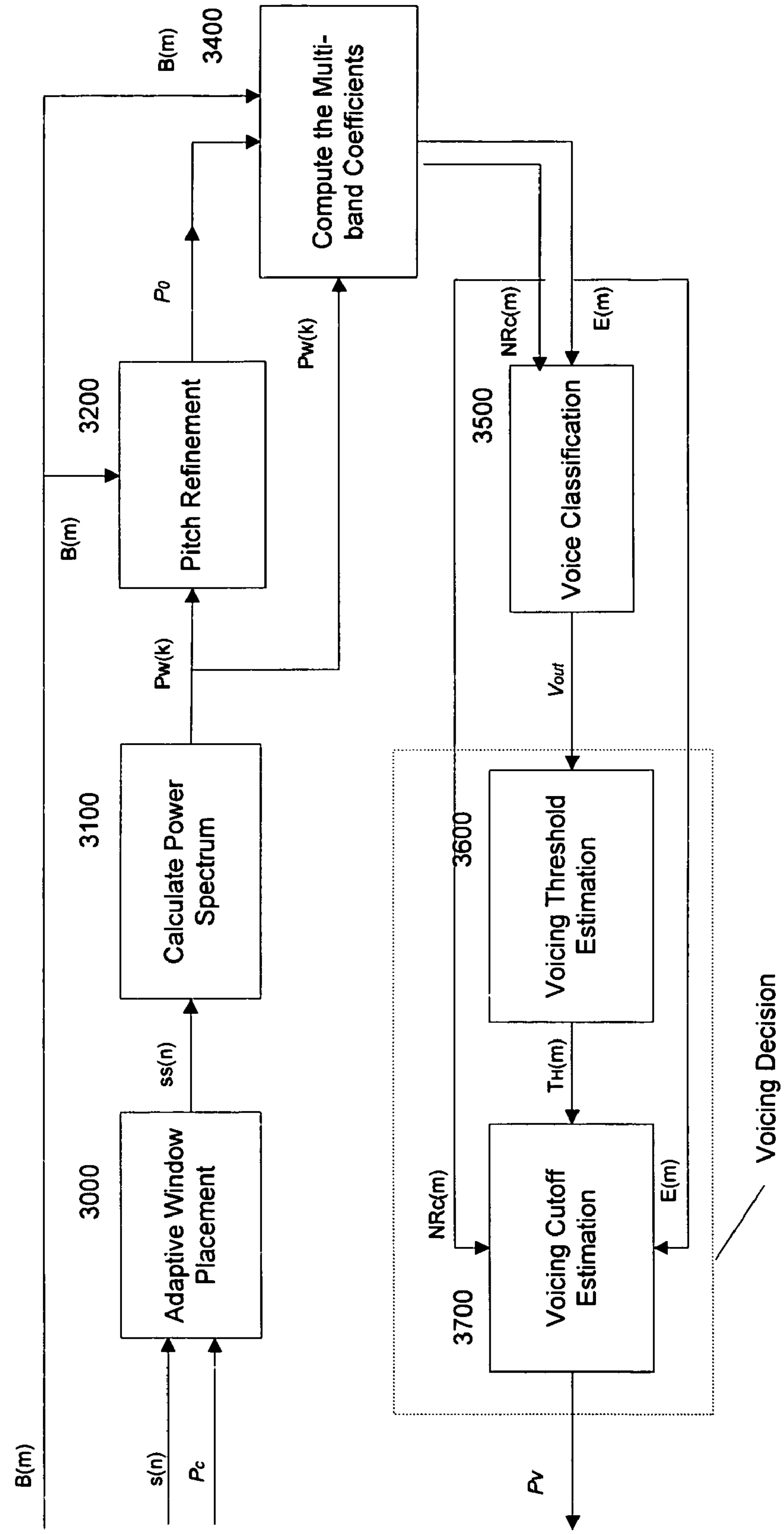
Figure 3 Voicing Estimation

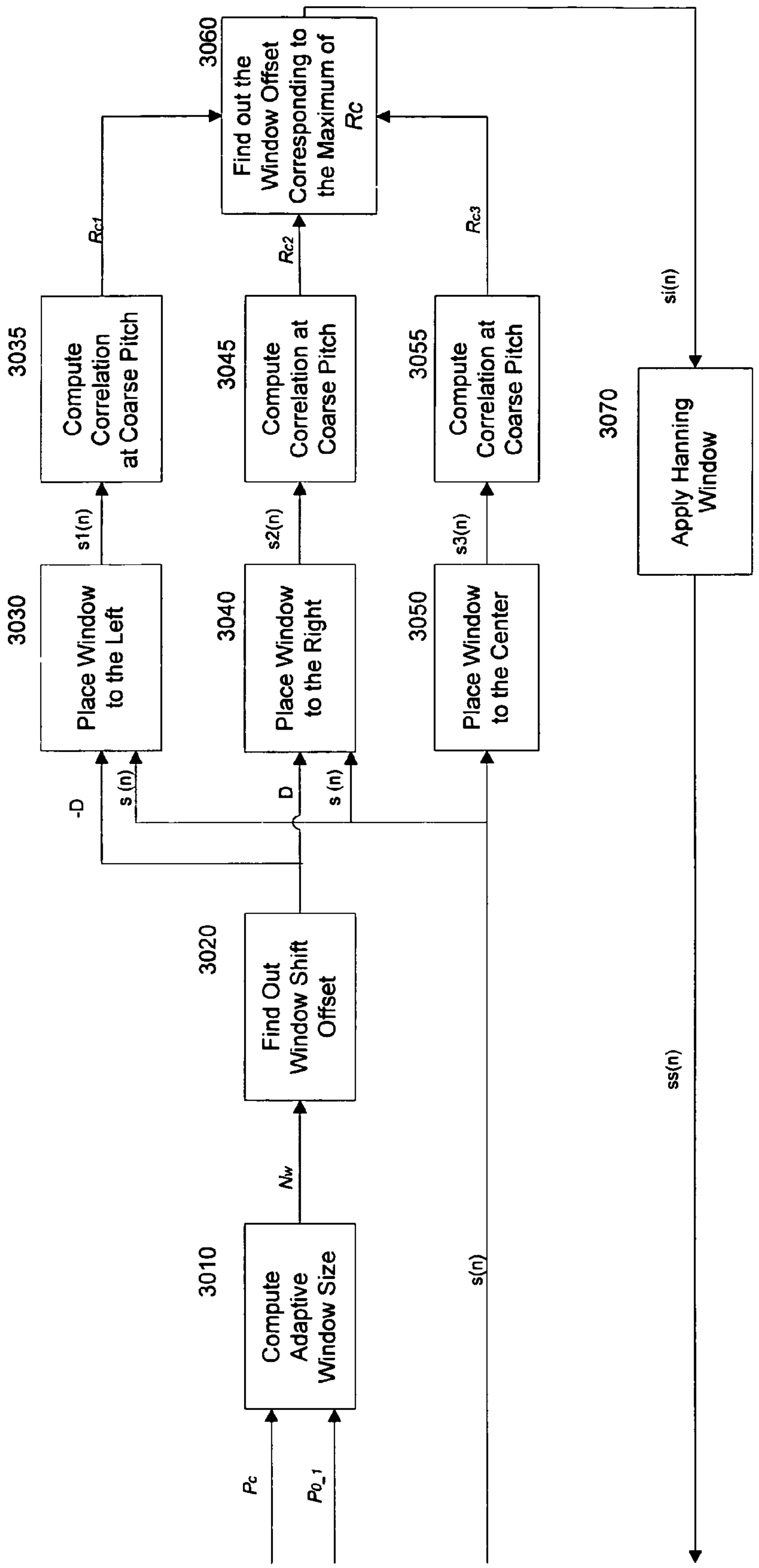
Figure 3.1. Adaptive Window Placement

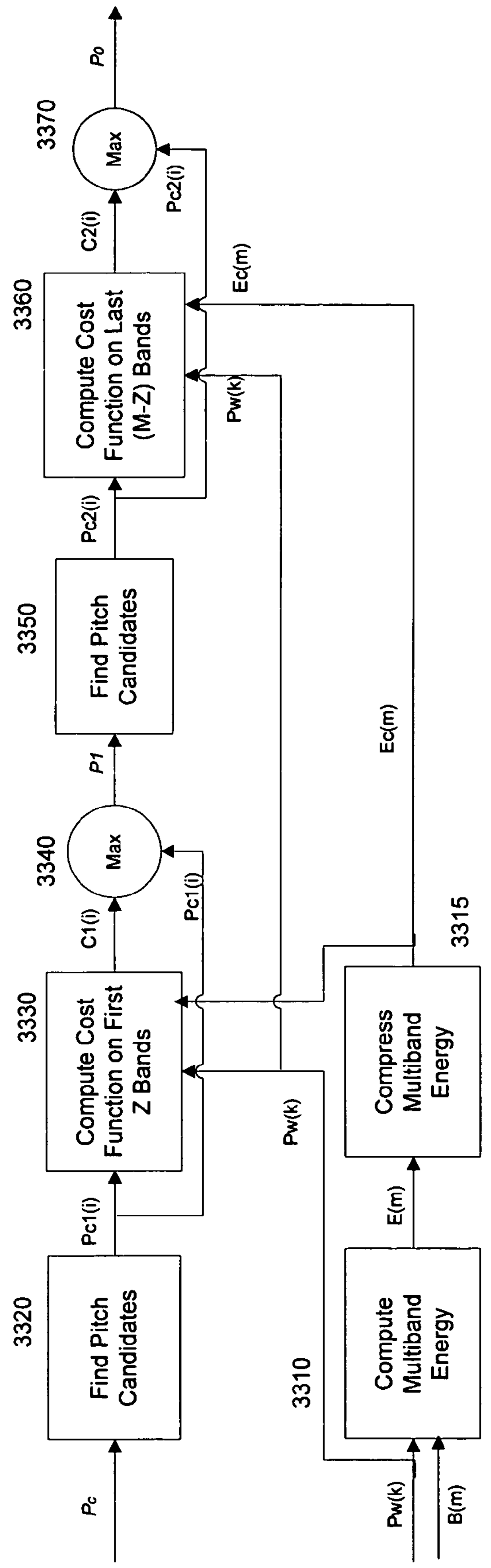
Figure 3.2. Pitch Refinement

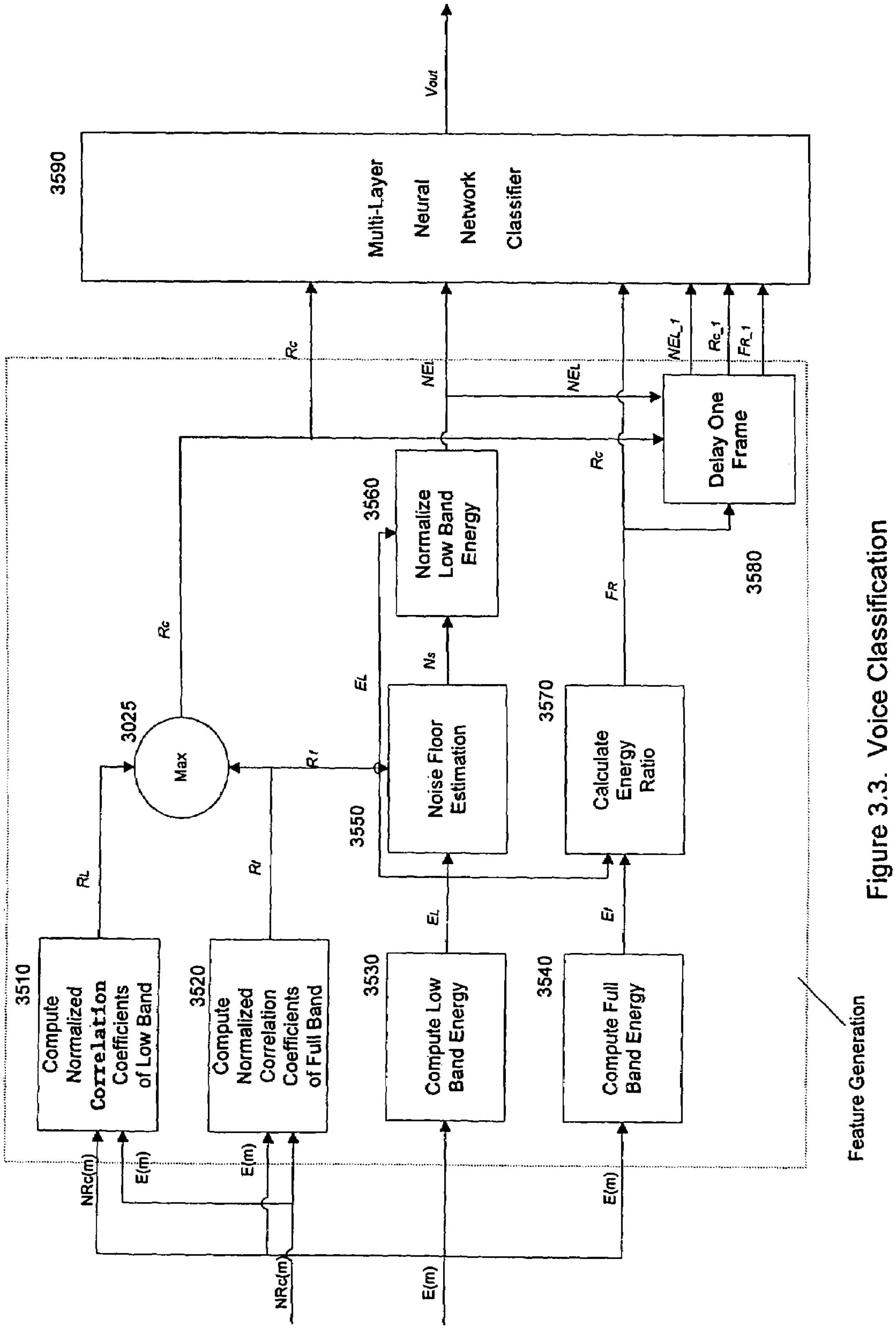
Figure 3.3. Voice Classification

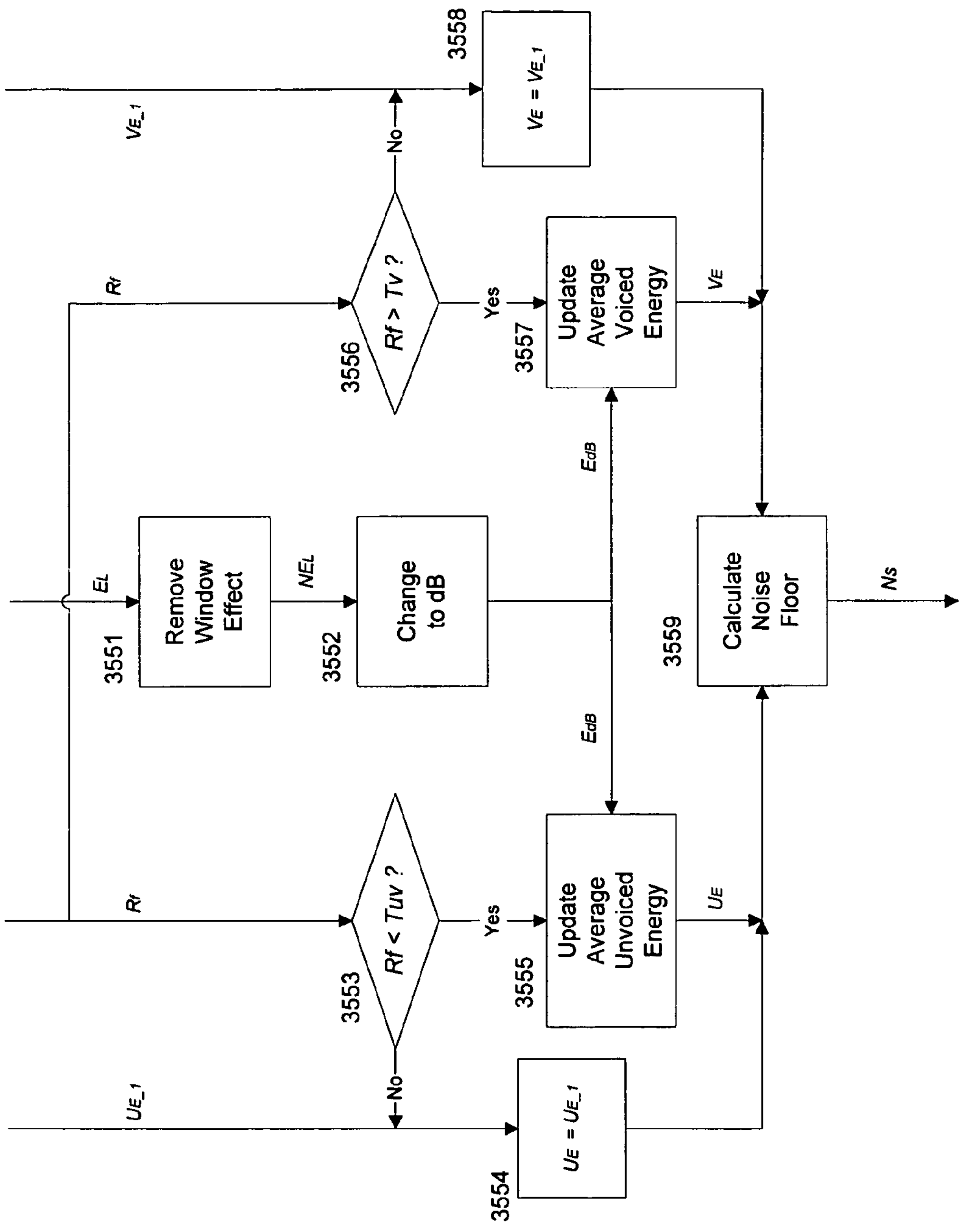
Figure 3.3.1. Noise Floor Estimation

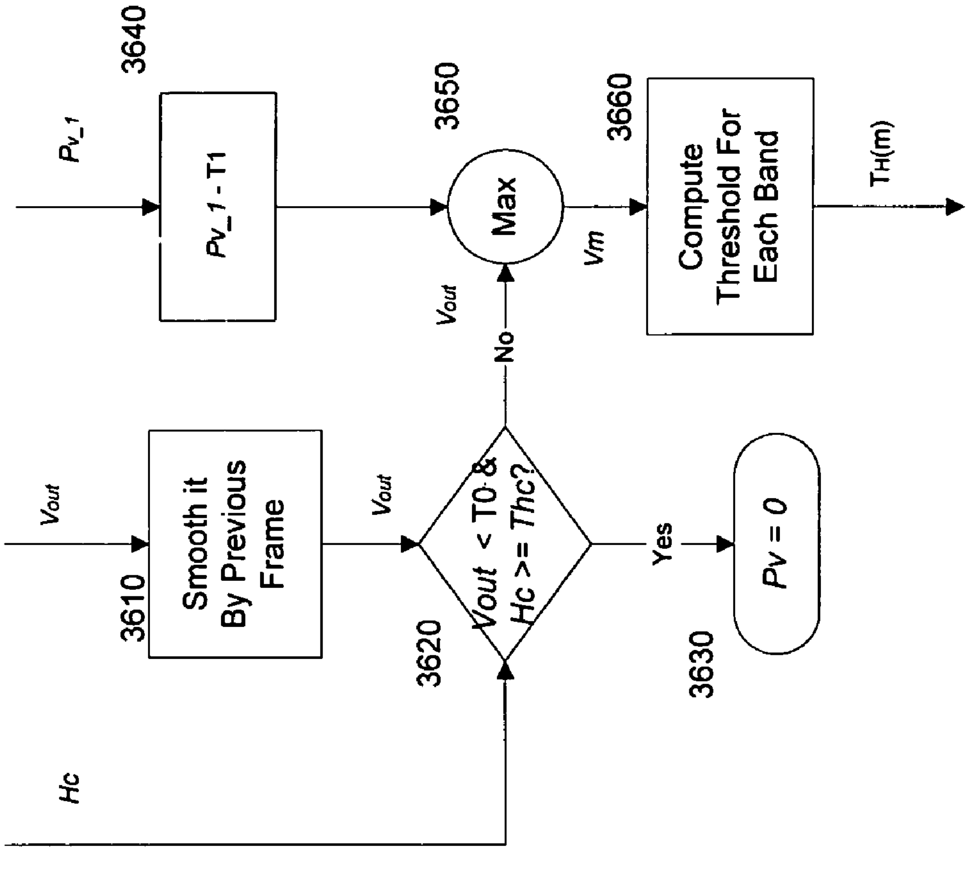
Figure 3.4. Voicing Threshold Estimation

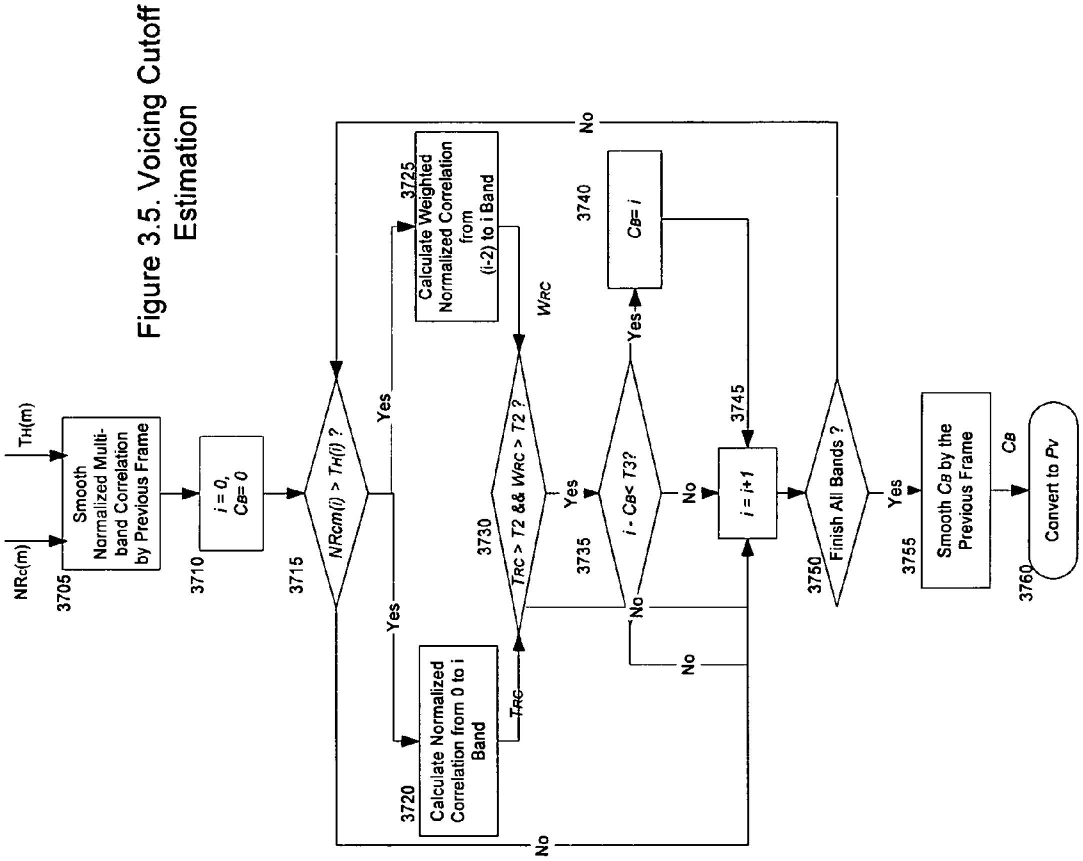
Figure 3.5. Voicing Cutoff Estimation

Figure 4 : Spectral Estimation
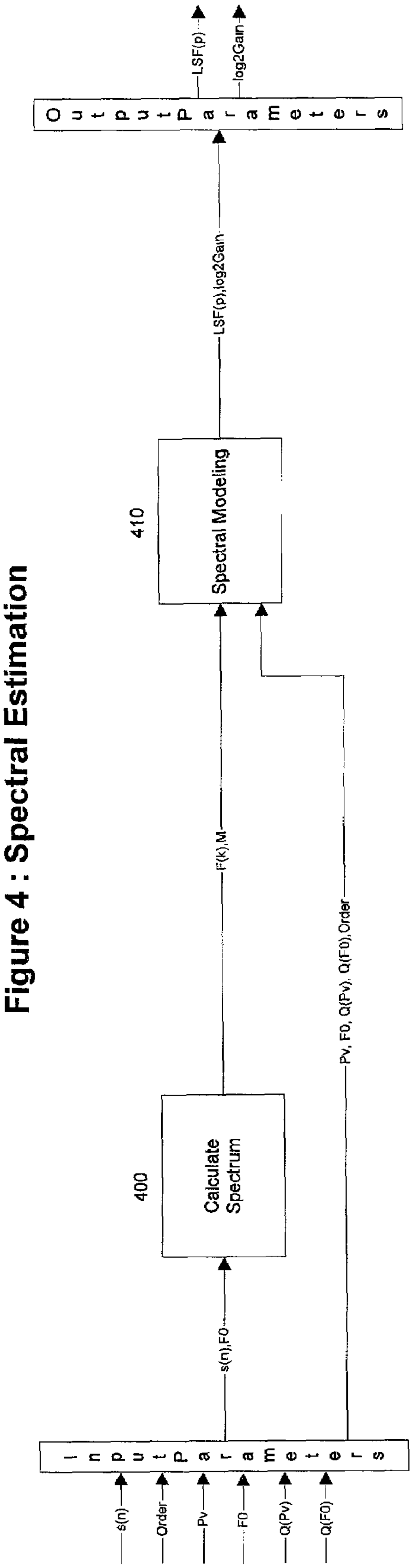
Figure 5 : Calculate Spectrum
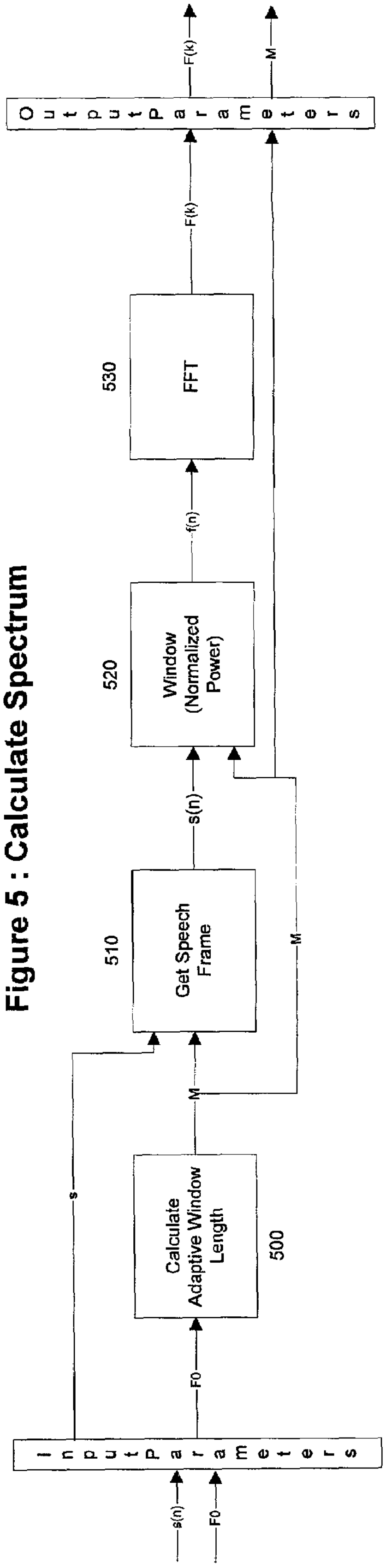

Figure 6 : Spectral Modeling
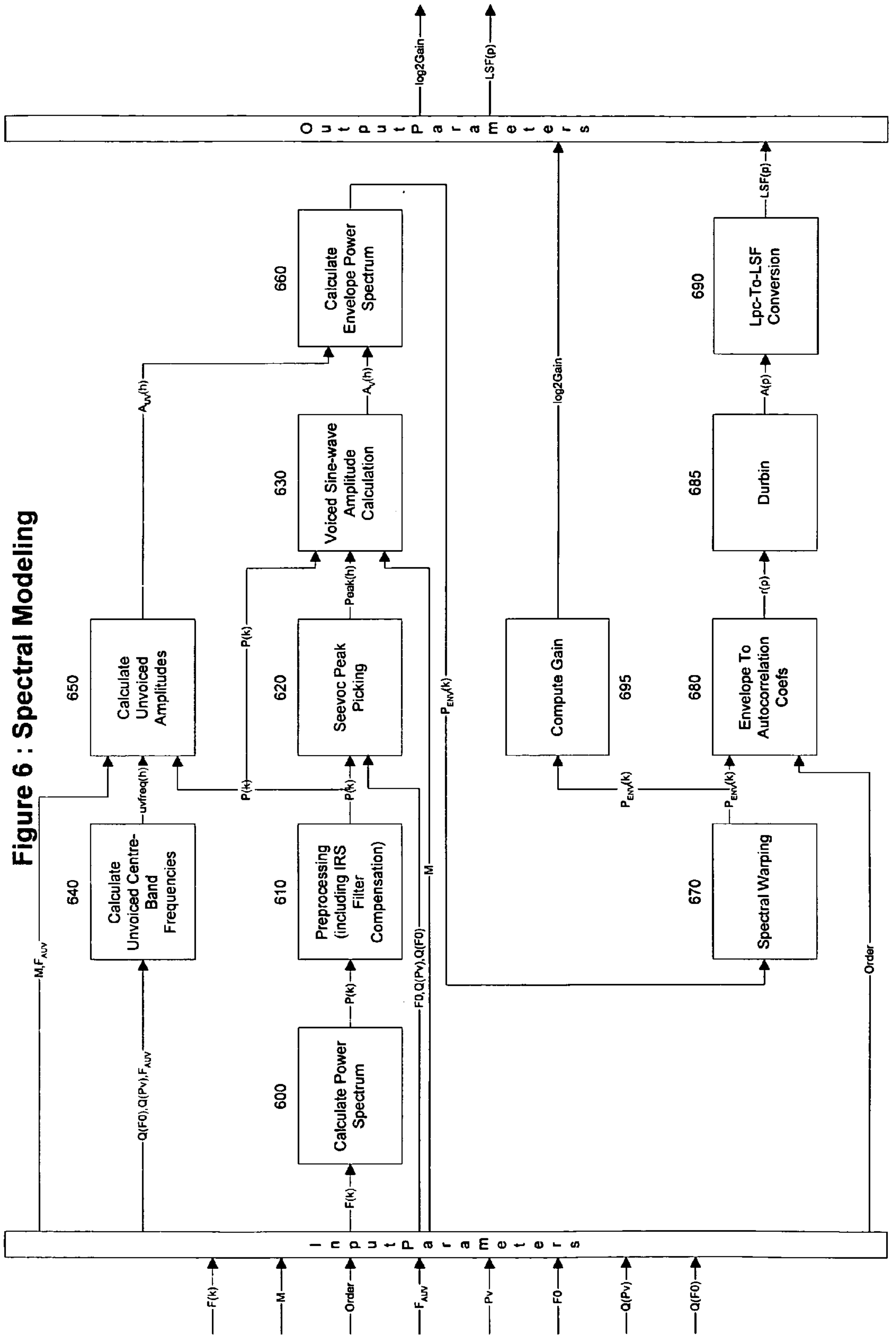

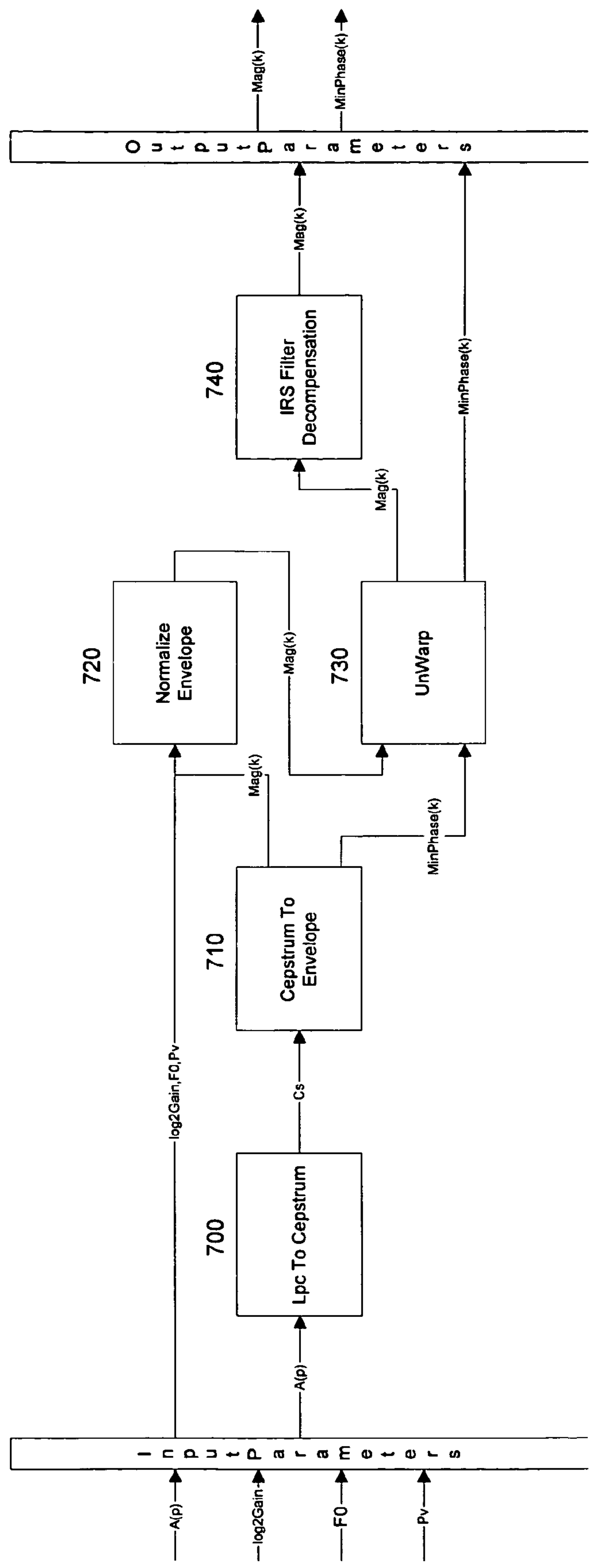
Figure 7 : Complex Spectrum Computation

Figure 8 : SNR Estimation
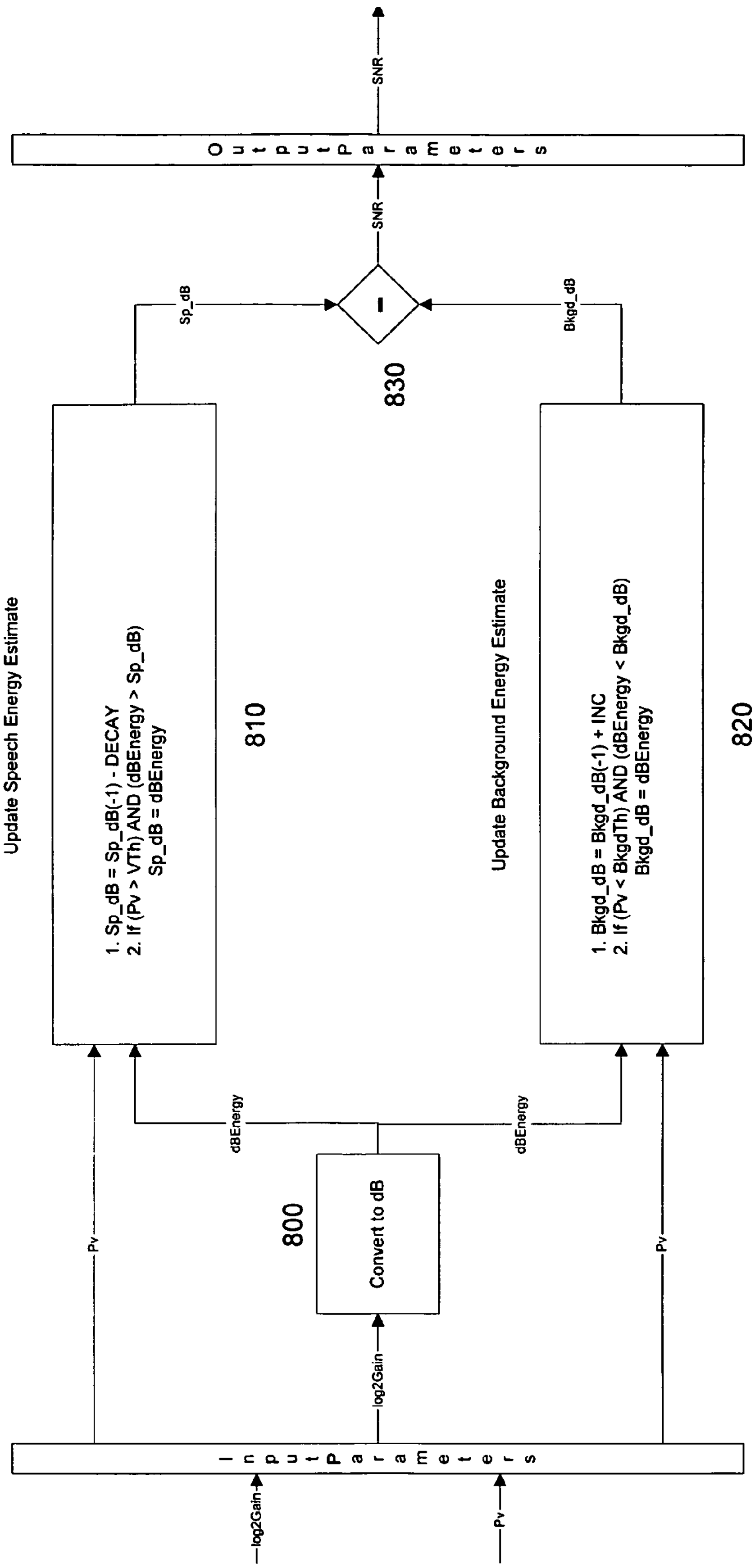

Figure 9 : Calculate Frequencies and Amplitudes
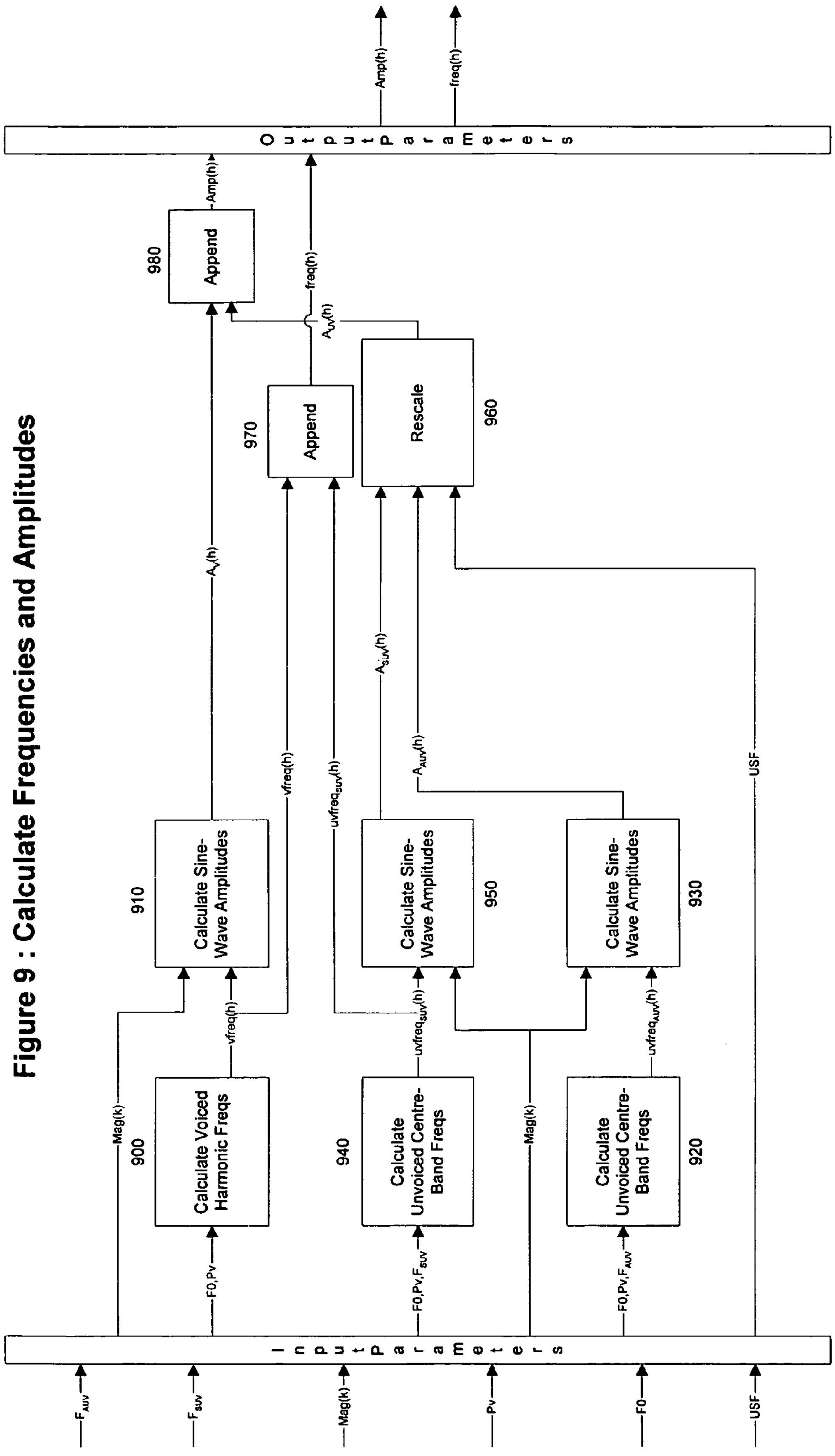

PARAMETRIC SPEECH CODEC FOR REPRESENTING SYNTHETIC SPEECH IN THE PRESENCE OF BACKGROUND NOISE

PRIORITY

This application claims priority from a United States Provisional application filed on Jul. 26, 1999 by Aguilar et al. having U.S. Provisional Application Ser. No. 60/145,591; the contents of which are incorporated herein by reference.

BACKGROUND OF THE INVENTION

1. Field of the Invention

The present invention relates generally to speech processing, and more particularly to a parametric speech codec for achieving high quality synthetic speech in the presence of background noise.

2. Description of the Prior Art

Parametric speech coders based on a sinusoidal speech production model have been shown to achieve high quality synthetic speech under certain input conditions. In fact, the parametric-based speech codec, as described in U.S. application Ser. No. 09/159,481, titled "Scalable and Embedded Codec For Speech and Audio Signals," and filed on Sep. 23, 1998 which has a common assignee, has achieved toll quality under a variety of input conditions. However, due to the underlying speech production model and the sensitivity to accurate parameter extraction, speech quality under various background noise conditions may suffer.

Accordingly, a need exists for a system for processing audio signals which addresses these shortcomings by modeling both speech and background noise simultaneously in an efficient and perceptually accurate manner, and by improving the parameter estimation under background noise conditions. The result is a robust parametric sinusoidal speech processing system that provides high quality speech under a large variety of input conditions.

SUMMARY OF THE INVENTION

The present invention addresses the problems found in the prior art by providing a system and method for processing audio and speech signals. The system and method use a pitch and voicing dependent spectral estimation algorithm (voicing algorithm) to accurately represent voiced speech, unvoiced speech, and mixed speech in the presence of background noise, and background noise with a single model. The present invention also modifies the synthesis model based on an estimate of the current input signal to improve the perceptual quality of the speech and background noise under a variety of input conditions.

The present invention also improves the voicing dependent spectral estimation algorithm robustness by introducing the use of a Multi-Layer Neural Network in the estimation process. The voicing dependent spectral estimation algorithm provides an accurate and robust estimate of the voicing probability under a variety of background noise conditions. This is essential to providing high quality intelligible speech in the presence of background noise.

BRIEF DESCRIPTION OF THE DRAWINGS

Various preferred embodiments are described herein with references to the drawings:

FIG. 1 is a block diagram of an encoder of the system of the present invention;

FIG. 2 is a block diagram of a decoder of the system of the present invention;

FIG. 3 is a block diagram illustrating how to estimate the voicing probability of the system of the present invention;

FIG. 3.1 is a block diagram illustrating how an adaptive window is placed on the pre-processed signal;

FIG. 3.2 is a block diagram illustrating how the pitch is refined in the frequency domain;

FIG. 3.3 is a block diagram illustrating the voice classification function of the present invention;

FIG. 3.3.1 is a block diagram illustrating how to generate the noise floor;

FIG. 3.4 is a block diagram illustrating how to estimate voicing threshold of each analysis band;

FIG. 3.5 is a block diagram illustrating how to find a cutoff band, where the corresponding boundary is the voicing probability;

FIG. 4 is a block diagram illustrating the how to spectrally estimate the current frame of the input signal;

FIG. 5 is a block diagram illustrating the function of the Calculate Spectrum block 400 shown in FIG. 4;

FIG. 6 is a block diagram illustrating the components of the Spectral Modeling block shown in FIG. 4;

FIG. 7 is a block diagram illustrating the components of the Complex Spectrum Computation block of FIG. 2;

FIG. 8 is a block diagram further illustrating the estimation algorithm of the present invention; and FIG. 9 is a block diagram illustrating the Calculate Frequencies and Amplitude block shown in FIG. 2.

DETAILED DESCRIPTION OF THE PREFERRED EMBODIMENTS

Referring now in detail to the drawings, in which like reference numerals represent similar or identical elements throughout the several views, and with particular reference to FIG. 1, there is shown a block diagram of the encoding principle used by the voice processing system of the present invention.

I. Harmonic Codec Overview

A. Encoder Overview

The encoding begins at Pre Processing block 100 where an input signal $s_o(n)$ is high-pass filtered and buffered into 20 ms frames. The resulting signal s(n) is fed into Pitch Estimation block 110 which analyzes the current speech frame and determines a coarse estimate of the pitch period, $P_C$. Voicing Estimation block 120 uses s(n) and the coarse pitch $P_C$ to estimate a voicing probability, $P_V$. The Voicing Estimation block 120 also refines the coarse pitch into a more accurate estimate, $P_O$. The voicing probability is a frequency domain scalar value normalized between 0.0 and 1.0. Below $P_V$, the spectrum is modeled as harmonics of $P_O$. The spectrum above $P_V$ is modeled with noise-like frequency components. Pitch Quantization block 125 and Voicing Quantization block 130 quantize the refined pitch $P_O$ and the voicing probability $P_V$, respectively. The model and quantized versions of the pitch period ($P_O$, $Q(P_O)$), the quantized voicing probability ($Q(P_V)$), and the pre-processed input signal ($s_o(n)$) are input parameters of the Spectral Estimation block 140.

The Spectral Estimation algorithm of the present invention first computes an estimate of the power spectrum of s(n) using a pitch adaptive window. A pitch $P_O$ and voicing probability $P_V$ dependent envelope is then computed and fit by an all-pole model. This all-pole model is represented by both Line Spectral Frequencies LSF(p) and by the gain, log2Gain, which are quantized by LSF Quantization block 145 and Gain Quantization block 150, respectively. Middle Frame Analysis block 160 uses the parameters s(n), $P_O$, $Q(P_O)$, and $Q(P_V)$ to estimate the 10 ms mid-frame pitch $P_{o\_mid}$ and voicing probability $P_{V\_mid}$. The mid-frame pitch $P_{O\_mid}$ is quantized by Middle Frame Pitch Quantization block 165, while the mid-frame voicing probability $P_{V\_mid}$ is quantized by Middle Frame Voicing Quantization block 170.

B. Decoder Overview

The decoding principle of the present invention is shown by the block diagram of FIG. 2. The decoding process begins with Unquantization block 200. This block unquantizes the codec parameters including the frame and mid-frame pitch period, $P_O$ and $P_{O\_mid}$ (or equivalent representation, the fundamental frequency F0 and F$\mathbf{0}_{mid}$), the frame and mid-frame voicing probability $P_V$ and $P_{V\_mid}$, the frame gain log2Gain, and the spectral envelope representation LSF(p) (which are converted to an equivalent representation, the Linear Prediction Coefficients A(p)). Parameters are unquantized once per 20 ms frame, but fed to Subframe Synthesizer block 250 on a 10 ms subframe basis. The parameters A(p), F0, log2Gain, and $P_V$ are used in Complex Spectrum Computation block 210. Here, the all-pole model A(p) is converted to a spectral magnitude envelope Mag(k) and a minimum phase envelope MinPhase(k). The magnitude envelope is scaled to the correct energy level using the log2Gain. The frequency scale warping performed at the encoder is removed from Mag(k) and MinPhase(k).

The Parameter Interpolation block 220 interpolates the magnitude Mag(k) and MinPhase(k) envelopes to a 10 ms basis for use in the Subframe Synthesizer. The log2Gain and $P_V$ are passed into the SNR Estimation block 230 to estimate the signal-to-noise ratio (SNR) of the input signal s(n). The SNR and $P_V$ are used in Input Characterization Classifier block 240. This classifier outputs three parameters used to control the postfilter operation and the generation of the spectral components above $P_V$. The Post Filter Attenuation Factor (PFAF) is a binary switch controlling the postfilter. The Unvoiced Suppression Factor (USF) is used to adjust the relative energy level of the spectrum above $P_V$. The synthesis unvoiced centre-band frequency ($F_{SUV}$) sets the frequency spacing for spectral synthesis above $P_V$.

Subframe Synthesizer block 250 operates on a 10 ms subframe basis. The 10 ms parameters are either obtained directly from the unquantization process (F$\mathbf{0}_{mid}$, $P_{V\_mid}$), or are interpolated. The FrameLoss flag is used to indicate a lost frame, in which case the previous frame parameters are used in the current frame. The magnitude envelope Mag(k) is filtered using a pitch and voicing dependent Postfilter block 260. The PFAF determines whether the current subframe is postfiltered or left unaltered. The sine-wave amplitudes Amp(h) and frequencies freq(h) are derived in Calculate Frequencies and Amplitudes block 270. The sine-wave frequencies freq(h) below $P_V$ are harmonically related based on the fundamental frequency F0. Above $P_V$, the frequency spacing is determined by $F_{SUV}$. The sine-wave amplitudes Amp(h) are obtained by sampling the spectral magnitude envelope Mag(k). The amplitudes Amp(h) above $P_V$ are adjusted according to the suppression factor USF. The parameters F0, $P_V$, MinPhase(k) and freq(h) are fed into Calculate Phase block 280 where the final sine-wave phases Phase(h) are derived. Below $P_V$, the minimum phase envelope MinPhase(k) is sampled at the sine-wave frequencies freq(h) and added to a linear phase component derived from F0. All phases Phase(h) above $P_V$ are randomized to model the noise-like characteristic of the spectrum. The amplitudes Amp(h), frequencies freq(h), and phases Phase(h) are fed into the Sum of Sine-Waves block 290 which performs a standard sum of sinusoids to produce the time-domain signal x(n). This signal is input to Overlap Add block 295. Here, x(n) is overlap-added with the previous subframe to produce the final synthetic speech signal $s_{hat}(n)$ which corresponds to input signal $s_o(n)$.

II. Detailed Description of Harmonic Encoder

A. Pre-Processing

As shown in FIG. 1, the Harmonic encoder starts from the pre-processing block 100. The pre-processor consists of a high pass filter, which has a cutoff frequency of less than 100 Hz. A first order pole/zero filter is used. The input signal filtered through this high pass filter is referred to as s(n), and will be used in other encoding blocks.

B. Pitch Estimation

The pitch estimation block 110 implements the Low-Delay Pitch Estimation algorithm (LDPDA) to the input signal s(n). LDPDA is described in detail in section B.6 of U.S. application Ser. No. 09/159,481, filed on Sep. 23, 1998 and having a common assignee; the contents of which are incorporated herein by reference. The only difference from U.S. application Ser. No. 09/159,481 is that the analysis window length is 271 instead of 291, and a factor called β for calculating Kaiser window is 5.1, instead of 6.0.

C. Voicing Estimation

FIG. 3 shows how to estimate the voicing probability of this system. Voicing probability is actually a cutoff frequency. Below this cutoff frequency, speech is modeled as voiced. Above it, speech is modeled as unvoiced. Starting from block 3000, an adaptive window is placed on the input signal of the current frame. The power spectrum is calculated in block 3100 from the windowed signal. The pitch of the current frame is refined in block 3200 by using the power spectrum. The pitch refinement algorithm is based on the multi-band correlation calculation, where the band boundaries are given by B(m). These predefined band boundaries B(m) non-linearly divide the spectrum into M bands, where the lower bands have narrow bandwidth and the upper bands have wide bandwidth. In block 3400, the multi-band correlation coefficients and the multi-band energy are computed using the power spectrum and the multi-band boundaries. A voice classifier is applied in block 3500, which estimates the current frame to be either voiced or unvoiced. In block 3600, the output from the voice classifier is used for computing the voicing thresholds of each analysis band. Finally, the voicing probability $P_V$ is estimated in block 3700 by analyzing the correlation of each band and the relationship across all of the bands.

C.1. Adaptive Window Placement

FIG. 3.1 further describes how the adaptive window is placed on the pre-processed signal. In block 3010, a pitch adaptive window size is calculated using the following equation:

$$Nw=K*Pc,$$

where K depends on pitch values of the current frame and the previous frame. An offset D is computed in block 3020 based on Nw. If D is greater than 0, three blocks of signal with the same window size but different locations are extracted from a circular buffer, as indicated in blocks 3030, 3040 and 3050. Around the coarse pitch, three time-domain correlation coefficients are computed from the three blocks of signals in blocks 3035, 3045 and 3055. This time-domain auto-correlation is shown in the following equation:

$$Rci = \sum_{n=0}^{Nw-1} (si(n) * si(n - Pc)),$$

where Rci is the correlation coefficient, si(n) is the input signal and $P_C$ is the coarse pitch. The block of speech with the highest correlation value is fed into Apply Hanning Window block 3070. This windowed signal is finally used for calculating the power spectrum with a FFT of length Nfft in the block 3100 of FIG. 3.

C.2. Pitch Refinement

FIG. 3.2 shows in greater detail how the pitch is refined in the frequency domain. Starting from block 3310, the multi-band energy is computed by using the following equation:

$$E(m) = \frac{2}{Nfft} \sum_{k=B(m)}^{B(m+1)} Pw(k),\ 0 \le m < M,$$

where Nfft is the length of FFT, M is the number of analysis band, E(m) represents the multi-band energy at the m'th band, Pw is the power spectrum and B(m) is the boundary of the m'th band. The multi-band energy is quarter-root compressed in block 3315 as shown below:

$$Ec(m)=E(m)^{0.25},\ 0 \leqq m < M.$$

The pitch refinement consists of two stages. The blocks 3320, 3330 and 3340 give in detail how to implement the first stage pitch refinement. The blocks 3350, 3360 and 3370 explain how to implement the second stage pitch refinement. In block 3320, Ni pitch candidates are selected around the coarse pitch, $P_C$. The pitch cost function for both stages can be expressed as shown below:

$$C(Pi) = \sum_{m=B1}^{B2} (NRc(m, Pi) * Ec(m)),$$

where NRc(m,Pi) is the normalized correlation coefficients of m'th band for pitch Pi, which can be computed in the frequency domain using the following equations:

$$Rc(m, Pi) = \frac{2}{Nfft} \sum_{i=B(m)}^{B(m+1)} \left(Pw(i) * \cos\left(\frac{2\pi}{Nfft} * i * Pi\right)\right),$$

$$NRc(m) = \frac{Rc(m, Pi)}{E(m)}.$$

In block 3330, the cost functions are evaluated from the first Z bands. In block 3360, the cost functions are calculated from the last (M–Z) bands. The pitch candidate who maximizes the cost function of the second stage is chosen as the refined pitch $P_O$ of the current frame.

C.3. Compute Multi-Band Coefficients

After the refined pitch $P_O$ is found, the normalized correlation coefficients Nrc(m) and the energy E(m) are recalculated for each band in block 3400 of FIG. 3. For both parameters, the band boundary Bn(m) is adjusted from the predefined boundary B(m) at the harmonic boundary, as shown in the following equations:

where $$Bn(0) = B(0),$$

$$Bn(m) = \left[\left(\left\lfloor \frac{B(m)}{F0} \right\rfloor + 0.5\right) * F0\right],\ 1 \le m < M,$$

$$F0 = \frac{Nfft}{P_0},$$

$[\ ] \equiv$ Rounding operator (i.e., $2 = [2.4]$, $3 = [2.5]$), $\lfloor\ \rfloor \equiv$ Floor operator (i.e., $2 = \lfloor 2.5 \rfloor$).

A normalization factor No is given below:

$$N_0 = \frac{\sum_{m=0}^{M-1} E(m)}{\sqrt{\sum_{n=0}^{Nw-1} (ss(n))^2 * \sum_{n=0}^{Nw-1} (ss(n - P_0))^2}} * \frac{\sqrt{\sum_{n=0}^{Nw-1} (w(n))^2 * \sum_{n=0}^{Nw-1} (w(n - P_0))^2}}{\sum_{n=0}^{Nw-1} w(n)w(n - P_0)},$$

where w(n) is the Hanning window and ss(n) is the windowed signal.

By applying the normalization factor No, the multi-band energy E(m) and the normalized correlation coefficient Nrc (m) are calculated by using the following equations:

$$E(m) = \frac{2}{Nfft} \sum_{k=Bn(m)}^{Bn(m+1)} Pw(k),\ 0 \le m < M,$$

$$NRc(m) = \frac{N_0}{E(m)} * \frac{2}{Nfft} \sum_{k=Bn(m)}^{Bn(m+1)} \left(Pw(k) * \cos\left(\frac{2\pi}{Nfft} * k * P_0\right)\right),\ 0 \le m < M.$$

C.4. Voice Classification

FIG. 3.3 shows in detail the function of voice classification. These are two main parts in this function: feature generation and classification. Blocks 3510 and 3580 are for feature generation and block 3590 is for classification. There are six parameters selected as features. Three of them are from the current frame, including the correlation coefficient Rc, the normalized low-band energy $NE_L$ and the energy ratio $F_R$. The other three are the same parameters but delayed by one frame, which are represented as $R_{c\_1}$, $NE_{L\_1}$ and $F_{R\_1}$.

The blocks 3510, 3520 and 3025 show how to generate the feature Rc. After calculating the normalized multi-band correlation coefficients and the multi-band energy in block 3400, the normalized correlation coefficient of certain bands can be estimated by:

$$Rt(a,b)=\sum_{m=a}^{b}(NRc(m)*E(m))\Big/\sum_{m=a}^{b}E(m),$$

where Rt(a,b) is the normalized correlation coefficient from band a to band b. Using the above equation, the low-band correlation coefficient $R_L$ is computed in block 3510 and the full-band correlation coefficient $R_f$ is computed in block 3520. In block 3025, the maximum of $R_L$ and $R_f$ is chosen as the feature Rc.

The blocks 3530, 3550 and 3560 give in detail how to compute the feature $NE_L$. Energy from the a'th band to b'th band can be estimated by:

$$Et(a,b)=\sum_{m=a}^{b}E(m).$$

The low-band energy, $E_L$, and the full-band energy, $E_f$, are computed in block 3530 and block 3540 using this equation. The normalized low-band energy $NE_L$ is calculated by:

$$NE_L=C*(E_L-N_s),$$

where C is a scaling factor to scale down $NE_L$ between −1 to 1, and Ns is an estimate of the noise floor from block 3550.

FIG. 3.3.1 describes in greater detail how to generate the noise floor Ns. In block 3551, the low band energy $E_L$ is normalized by the L2 norm of window function, and then converted to dB in block 3552. The noise floor Ns is calculated in block 3559 from the weighted long-term average unvoiced energy (computed in blocks 3553, 3554, and 3555) and long-term average voiced energy (computed from blocks 3556, 3557, and 3558).

As shown in FIG. 3.3, block 3570 computes the energy ratio FR from the low-band energy $E_L$ and the full-band energy $E_f$. After the other three parameters are obtained from previous frame as shown in block 3580, the six parameters are combined together and put to Multi-Layer Neural Network Classifier block 3590.

The Multilayer Neural Network, block 3590, is chosen to classify the current frame to be a voiced frame or an unvoiced frame. There are three layers in this network: the input layer, the middle layer and the output layer. The number of nodes for the input layer is six, the same as the number of input features. The number of hidden nodes is chosen to be three. Since there is only one voicing output $V_{out}$, the output node is one, which outputs a scalar value between 0 to 1. The weighing coefficients for connecting the input layer to hidden layer and hidden layer to output layer are pre-trained using back-propagation algorithm described in Zurada, J. M., Introduction to Artificial Neural Systems, St. Paul, Minn., West Publishing Company, pages 186–90, 1992. By non-linearly mapping the input features through the Neural Network Voice Classifier, the output $V_{out}$ will be used to adjust the voicing decision.

C.5. Voicing Decision

In FIG. 3, blocks 3600 and 3700 are combined together to determine the voicing probability $P_V$. FIG. 3.4 describes in greater detail how to estimate voicing threshold of each analysis band. Starting from block 3610, $V_{out}$ is smoothed slightly by $V_{out}$ of the previous frame. If $V_{out}$ is smaller than a threshold $T_o$ and such conditions are true for several frames, the current frame is classified as an unvoiced frame, and the voicing probability $P_V$ is set to 0. Otherwise, the voicing algorithm continues by calculating a threshold for each band. The input for block 3680, $V_m$, is the maximum of $V_{out}$ and the offset-removed previous voicing probability $P_V$. The threshold of the first band is given by:

$$T_{H0}=C_1-C_2*V_m^2,$$

and the variations between two neighbor bands is given by:

$$\Delta=C_3-C_4*V_m^2,$$

where $C_1$, $C_2$, $C_3$ and $C_4$ are pre-defined constants. Finally, the threshold of m'th band is computed as:

$$T_H(m)=T_{H0}+m*\Delta,\ 0\leq m<M.$$

The next step for the voicing decision is to find a cutoff band, CB, where the corresponding boundary, $B(C_B)$, is the voicing probability, $P_V$. The flowchart of this algorithm is shown in FIG. 3.5. In block 3705, the correlation coefficients, Nrc(m), are smoothed by the previous frames. Starting from the first band Nrc(m) is tested against the threshold $T_H(m)$. If the test is false, the analysis band will jump to the next band. Otherwise, other three conditions have to pass before the current band can be claimed as a cutoff band $C_B$. First, a normalized correlation coefficient from the first band to the current band must be larger than a voiced threshold $T_2$. The coefficient of the i'th band $T_{RC}(i)$ is calculated in block 3720 and is shown in the following equation:

$$T_{RC}(i)=\frac{\sum_{m=0}^{i}(NRc(m)*E(m))}{\sum_{k=0}^{i}E(m)},\ 0\leq i<M.$$

Secondly, a weighted normalized correlation coefficient from the current band to the two past bands must be greater than $T_2$. The coefficient of the i'th band $W_{RC}(i)$ is calculated in block 3725 and is shown in the following equation:

$$W_{RC}(i)=\frac{\sum_{m=0}^{2}(Am*NRc(i-m)*E(i-m))}{\sum_{m=0}^{2}(Am*E(m))},\ 0\leq i<M,$$

where the weighting factors $A_0$, $A_1$, and $A_2$ are chosen to be 1, 0.5 and 0.08. These weighting factors act as hearing masks. Finally, the distance between two selected voiced bands has to be smaller than another threshold, $T_3$, as shown in 3750. If all three conditions are met, the current band is defined as the voiced cutoff band $C_B$.

After all the analysis bands are tested, $C_B$ is smoothed by the previous frame in block 3755. Finally, $C_B$ is converted to the voicing probability $P_V$ in block 3760.

D. Spectral Estimation

FIG. 4 shows the method used for spectral estimation of the current frame of input signal s(n). Calculate Spectrum block 400 calculates the complex spectrum F(k). Spectral Modeling block 410 models the complex spectra with an all-pole envelope represented by the Line Spectrum Frequencies LSF(p), and the signal gain log2Gain.

FIG. 5 further describes the function of block 400. The complex spectrum F(k) is computed based on a pitch adaptive window. The length of the window M is calculated in Calculate Adaptive Window block 500 based on the fundamental frequency F0. Note that the pitch period $P_O$ is referred to by the fundamental frequency F0 for the remainder of this section. A block of speech of length M corresponding to the current frame is obtained in Get Speech Frame block 510 from a circular buffer. The speech signal s(n) is then windowed in Window (Normalized Power) block 520 by a window normalized according to the following criterion:

$$w(n) \equiv \text{A discrete normalized window function (i.e., Hamming)}$$
$$\text{of length } M;\ M \le N \text{ where } w(n) \text{ is normalized to meet the constraint}$$
$$1.0 = \frac{1}{M}\sum_{n=0}^{M-1} w^2(n)$$

Finally, the complex spectrum F(k) is calculated in FFT block 530 from the windowed speech signal f(n) by an FFT of length N.

FIG. 6 illustrates in greater detail the main elements of 410. The complex spectra F(k) is used in 600 to calculate the power spectrum P(k) that is then filtered by the inverse response of a modified IRS filter in 610. The spectral peaks are located using the Seevoc peak picking algorithm in Block 620, the method of which is identical to FIG. 5, Block 50 of U.S. application Ser. No. 09/159,481.

Peak(h) contains a peak frequency location for each harmonic bin up to the quantized voicing probability cutoff $Q(P_V)$. The number of voiced harmonics is specified by:

where $$H_v \equiv \text{Total number of voiced harmonics}$$
$$= \left[\frac{Q(Pv)\cdot f_s}{2\cdot Q(F0)}\right] \text{ where}$$
$$[\,] \equiv \text{Rounding operator (i.e., } 2 = [2.4],\ 3 = [2.5]).$$

and $f_s$ is the sampling frequency.

The parameters Peak(h), and P(k) are used in block 630 to calculate the voiced sine-wave amplitudes specified by:

$$A_V(h) \equiv \text{Sequence of harmonic amplitudes of length } H_V$$
$$= \frac{2}{\sum_{m=0}^{M-1} w(m)}\cdot\sqrt{P(k)};\quad k = \left[\frac{Peak(h)\cdot N}{f_s}\right] \quad h = 0, 1, 2, \ldots, H_V - 1$$

The quantized fundamental frequency Q(F0), $Q(P_V)$, and the unvoiced centre-band analysis spacing specified by:

$$F_{AUV} \equiv \text{Unvoiced centre-band analysis spacing} \in \left[0, \frac{f_s}{2}\right]$$

are used as input to block 640 to calculate the unvoiced centre-band frequencies. These frequencies are determined by:

$$uvfreq(h) \equiv \text{Unvoiced Centre-Band Frequencies}$$
$$= \left[\left((H_V + 0.5)\frac{Q(F0)}{f_s}N\right) + \left(\frac{F_{AUV}}{f_s}\cdot N\cdot h\right)\right];$$
$$h = 0, 1, 2, \ldots, H_{UV} - 1 \text{ where}$$
$$H_{UV} \equiv \text{Total number of unvoiced centre-band frequencies.}$$
$$= \text{max integer} \ni \left[\left((H_V + 0.5)\frac{Q(F0)}{f_s}N\right) + \left(\frac{F_{AUV}}{f_s}\cdot N\cdot (H_{UV}+1)\right)\right] < \frac{N}{2}.$$

The selection of $F_{AUV}$ has an effect both on the accuracy of the all-pole model and on the perceptual quality of the final synthetic speech output, especially during background noise. The best range was found experimentally to be 60.0–90.0 Hz.

The sine-wave amplitudes at each unvoiced centre-band frequency are calculated in block 650 by the following equation:

$$A_{UV}(h) \equiv \text{Unvoiced Centre-Band Amplitudes}$$
$$= \left[\frac{4}{N\cdot M}\cdot\sum_{k=uvfreq(h)}^{k<uvfreq(h+1)} P(k)\right]^{1/2};\ h = 0, 1, 2, \ldots, H_{UV} - 1$$

A smooth estimate of the spectral envelope $P_{ENV}(k)$ is calculated in block 660 from the sine-wave amplitudes. This can be achieved by various methods of interpolation. The frequency axis of this envelope is then warped on a perceptual scale in block 670. An all-pole model is then fit to the smoothed envelope $P_{ENV}(k)$ by the process of conversion to autocorrelation coefficients (block 680) and Durbin recursion (block 685) to obtain the linear prediction coefficients (LPC), A(p). An 18th order model is used, but the order model used for processing speech may be selected in the range from 10 to about 22. The A(p) are converted to Line Spectral Frequencies LSF(p) in LPC-To-LSF Conversion block 690.

The gain is computed from $P_{ENV}(k)$ in Block 695 by the equation:

$$\text{log2}Gain = 0.5\cdot\log_2\left(\sum_{k=0}^{H_V} P_{ENV}\left(\left[k\cdot\left(\frac{Q(F0)}{f_s}\cdot N\right)\right]\right) + \sum_{l=0}^{H_{UV}} P_{ENV}(uvfreq(l))\right)$$

E. Middle Frame Analysis

The middle frame analysis block 160 consists of two parts. The first part is middle frame pitch analysis and the second part is middle frame voicing analysis. Both algorithms are described in detail in section B.7 of U.S. application Ser. No. 09/159,481.

F. Quantization

The model parameters comprising the pitch $P_O$ (or equivalently, the fundamental frequency F0), the voicing probability $P_V$, the all-pole model spectrum represented by the LSF(p)'s, and the signal gain log2Gain are quantized for transmission through the channel. The bit allocation of the 4.0 kb/s codec is shown in Table 1. All quantization tables are reordered in an attempt to reduce the bit-error sensitivity of the quantization.

TABLE 1

| Bit Allocation | | | |
|---|---|---|---|
| Parameter | 10 ms | 20 ms | Total |
| Fundamental Frequency | 1 | 8 | 9 |
| Voicing Probability | 1 | 4 | 5 |
| Gain | 0 | 6 | 6 |
| Spectrum | 0 | 60 | 60 |
| Total | 2 | 78 | 80 |

F.1. Pitch Quantization

In the Pitch Quantization block 125, the fundamental frequency F0 is scalar quantized linearly in the log domain every 20 ms with 8 bits.

F.2. Middle Frame Pitch Quantization

In Middle Frame Pitch Quantization block 165, the mid-frame pitch is quantized using a single frame-fill bit. If the pitch is determined to be continuous based on previous frame, the pitch is interpolated at the decoder. If the pitch is not continuous, the frame-fill bit is used to indicate whether to use the current frame or the previous frame pitch in the current subframe.

F.3. Voicing Quantization

The voicing probability $P_V$ is scalar quantized with four bits by the Voicing Quantization block 130.

F.4. Middle Frame Voicing Quantization

In Middle Frame Quantization, the mid-frame voicing probability $Pv_{mid}$ is quantized using a single bit. The pitch continuity is used in an identical fashion as in block 165 and the bit is used to indicate whether to use the current frame or the previous frame $P_V$ in the current subframe for discontinuous pitch frames.

F.5. LSF Quantization

The LSF Quantization block 145 quantizes the Line Spectral Frequencies LSF(p). In order to reduce the complexity and store requirements, the 18th order LSFs are split and quantized by Multi-Stage Vector Quantization (MSVQ). The structure and bit allocation is described in Table 2.

TABLE 2

| LSF Quantization Structure | | |
|---|---|---|
| LSF | MSVQ Structure | Bits |
| 0–5 | 6-5-5-5 | 21 |
| 6–11 | 6-6-6-5 | 23 |
| 12–17 | 6-5-5 | 16 |
| Total | | 60 |

In the MSVQ quantization, a total of eight candidate vectors are stored at each stage of the search.

F.6. Gain Quantization

The Gain Quantization block 150 quantizes the gain in the log domain (log2Gain) by a scalar quantizer using six bits.

III. Detailed Description of Harmonic Decoder

A. Complex Spectrum Computation

FIG. 7 further describes the Complex Spectrum Computation block 210 of FIG. 2. The process begins by calculating the minimum phase envelope MinPhase(k) and log2 spectral magnitude envelope Mag(k) from the linear reductions coefficients A(p) through the process of LPC To Cepstrum block 700 and Cepstrum To Envelope block 710. This process is identical to that described by block 15 FIG. 6 in U.S. application Ser. No. 09/159,481.

The log2Gain, F0, and $P_V$ are used to normalize the magnitude envelope to the correct energy in Normalize Envelope block 720. The log2 magnitude envelope Mag(k) is normalized according to the following formula:

$$Mag(k) = Mag(k) + \log 2Gain - 0.5 \cdot \log_2\left( \sum_{i=0}^{H_V} 2.0^{Mag\left(\left[i - \left(\frac{F0)}{fs} \cdot N\right)\right]\right)} + \sum_{j=0}^{H_{UV}} 2.0^{(Mag(uvfreq(j)))} \right)$$

where $H_v$, $H_{UV}$, and uvfreq( ) are calculated in an identical fashion as in block 410 of FIG. 4. N is the length of Mag(k)(−pi to pi) which is set to be the same as the FFT size on the encoder in block 400 of FIG. 4.

The frequency axis of the envelopes MinPhase(k) and Mag(k) are then transformed back to a linear axis in Unwarp block 730. The modified IRS filter response is re-applied to Mag(k) in IRS Filter Decompensation block 740.

B. Parameter Interpolation

The envelopes Mag(k) and MinPhase(k) are interpolated in Parameter Interpolation block 220. The interpolation is based on the previous frame and current frame envelopes to obtain the envelopes for use on a subframe basis.

C. SNR Estimation

The log2Gain and voicing probability $P_V$ are used to estimate the signal-to-noise ratio (SNR) in SNR Estimation block 230. FIG. 8 further describes the estimation algorithm. In Convert to dB block 800, the log2Gain is converted to dB. The algorithm then computes an estimate of the active speech energy level Sp_dB, and the background noise energy level Bkgd_dB. The methods for these estimations are described in blocks 810 and 820, respectively. Finally, the background noise level Bkgd_dB is subtracted from the speech energy level Sp_dB to obtain the estimate of the SNR.

D. Input Characterization Classifier

The SNR and $P_V$ are used in the Input Characterization Classifier block 240. The classifier outputs three parameters used to control the postfilter operation and the generation of the spectral components above $P_V$. The Post Filter Attenuation Factor (PFAF) is a binary switch controlling the postfilter. If the SNR is less than a threshold, and $P_V$ is less than a threshold, PFAF is set to disable the postfilter for the current frame.

The Unvoiced Suppression Factor (USF) is used to adjust the relative energy level of the spectrum above $P_V$. The USF is perceptually tuned and is currently a constant value. The synthesis unvoiced centre-band frequency ($F_{SUV}$) sets the frequency spacing for spectral synthesis above $P_V$. The spacing is based on the SNR estimate and is perceptually tuned.

E. Subframe Synthesizer

The Subframe Synthesizer block 250 operates on a 10 ms subframe size. The subframe synthesizer is composed of the following blocks: Postfilter block 260, Calculate Frequencies and Amplitudes block 270, Calculate Phase block 280, Sum of Sine-Wave Synthesis block 290, and OverlapAdd block 295. The parameters of the synthesizer include Mag (k), MinPhase(k), F0, and $P_V$. The synthesizer also requires the control flags $F_{SUV}$, USF, PFAF, and FrameLoss. During the subframe corresponding to the mid-frame on the encoder, the parameters are either obtained directly ($F0_{mid}$, $Pv_{mid}$) or are interpolated (Mag(k), MinPhase(k)). If a lost frame occurs, as indicated by the FrameLoss flag, the parameters from the last frame are used in the current frame. The output of the subframe synthesizer is 10 ms of synthetic speech $s_{hat}(n)$.

F. Postfilter

The Mag(k), F0, $P_V$, and PFAF are passed to the PostFilter block 260. The PFAF is a binary switch either enabling or disabling the postfilter. The postfilter operates in an equivalent manner to the postfilter described in Kleijn, W. B. et al., eds., Speech Coding and Synthesis, Amsterdam, The Netherlands, Elsevier Science B.V., pages 148–150, 1995. The primary enhancement made in this new postfilter is that it is made pitch adaptive. The pitch (F0 expressed in Hz) adaptive compression factor gamma used in the postfilter is expressed in the following equation:

$$\gamma(F0)=\begin{cases}\gamma_{\min}; & \text{if } F0<F\min,\\ \gamma_{\max}; & \text{if } F0<F\max,\\ \dfrac{\gamma_{\max}-\gamma_{\min}}{\log(F\max)-\log(F\min)}\cdot(\log(F0)-\log(F\min))+\gamma_{\min}; & \text{otherwise}\end{cases}$$

The pitch adaptive postfilter weighting function used is expressed in the following equation:

$$P(F0)=\begin{cases}\log^{-1}(G(l)\cdot\log(1.0+0.4\cdot\gamma(F0))); & \text{if } W_l>1.0+0.4\cdot\gamma_{\min}\\ \log^{-1}(G(l)\cdot\log(1.0-\gamma(F0))); & \text{if } W_l<1.0-\gamma(F0)\\ \log^{-1}(G(l)\cdot\log(W_l)); & \text{otherwise}\end{cases}$$

where $W_l \equiv$ the weighted spectral component at the $l$th frequency.

$l \in [0-4000\text{ Hz}]$ and $$G(l)=\begin{cases}1.0; & \text{if } l>l_{low}\\ \dfrac{l}{l_{low}}; & \text{otherwise.}\end{cases}$$

The following constants are preferred:

| | | |
|---|---|---|
| Fmin | = | 125 Hz, |
| Fmax | = | 175 Hz, |
| γmin | = | 0.3, |
| γmax | = | 0.45, |
| $l_{low}$ | = | 1000 Hz |

G. Calculate Frequencies and Amplitudes

FIG. 9 further describes Calculate Frequencies and Amplitudes block 270 of FIG. 2. The fundamental frequency F0 and the voicing probability $P_V$ are used in Calculate Voiced Harmonic Freqs block 900 to calculate vfreq(h) according to $$vfreq(h)\equiv\text{Voiced Harmonic Frequencies}$$
$$=\left[\left(\frac{FO}{f_s}\cdot N\cdot h\right)\right];\ h=0,1,2,\ldots,H_V-1$$

The sine-wave amplitudes for the voiced harmonics are calculated in Calculate Sine-Wave Amplitudes block 910 by the formula:

$$A_V(h)=2.0^{Mag(vfreq(h))+1.0)};h=0,1,2,\ldots,H_V-1$$

In the next step, the unvoiced centre-band frequencies $uvfreq_{AUV}(h)$ are calculated in blocks 920 in the identical fashion done at the encoder in block 410 of FIG. 4. The AUV subscript is used to specify that the spacing used is the analysis spacing, $F_{AUV}$. The unvoiced centre-band frequencies are calculated in block 930 by the equation:

$$A_{AUV}(h)=2.0^{(Mag(uvfreqAUV(h))+1.0)};h=0,1,2,\ldots,H_{UV}-1$$

The amplitudes $A_{AUV}(h)$ at the analysis spacing $F_{AUV}$ are calculated to determine the exact amount of energy in the spectrum above $P_V$ in the original signal. This energy will be required later when the synthesis spacing is used and the energy needs to be rescaled.

The unvoiced centre-band frequencies $uvfreq_{SUV}(h)$ are calculated at the synthesis spacing $F_{SUV}$ in block 940. The method used to calculate the frequencies is identical to the encoder in block 410 of FIG. 4, except that $F_{SUV}$ is used in place of $F_{AUV}$. The amplitudes $A_{SUV}(h)$ are calculated in block 950 according to the equation:

$$A_{SUV}(h)=2.0^{(Mag(uvfreqSUV(h))+1.0)};h=0,1,2,\ldots,H_{SUV}-1$$

where $H_{SUV}$ is the number of unvoiced frequencies calculated with $F_{SUV}$.

The amplitudes $A_{SUV}(h)$ are scaled in Rescale block 960 such that the total energy is identical to the energy in the amplitudes $A_{AUV}(h)$. The energy in $A_{AUV}(h)$ is also adjusted according to the unvoiced suppression factor USF.

In the final step, the voiced and unvoiced frequency vectors are combined in block 970 to obtain freq(h). An identical procedure is done in block 980 with the amplitude vectors to obtain Amp(h).

H. Calculate Phase

The parameters F0, $P_V$, MinPhase(k) and freq(h) are fed into Calculate Phase block 280 where the final sine-wave phases Phase(h) are derived. Below $P_V$, the minimum phase envelope MinPhase(k) is sampled at the sine-wave frequencies freq(h) and added to a linear phase component derived from F0. This procedure is identical to that of block 756, FIG. 7 in U.S. application Ser. No. 09/159,481.

I. Sum of Sine-Wave Synthesis

The amplitudes Amp(h), frequencies freq(h), and phases Phase(h) are used in Sum of Sine-Wave Synthesis block 290 to produce the signal x(n).

J. Overlap-Add

The signal x(n) is overlap-added with the previous subframe signal in OverlapAdd block 295. This procedure is identical to that of block 758, FIG. 7 in U.S. application Ser. No. 09/159,481.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A system for processing an audio signal comprising:
- means for dividing the audio signal into segments, each segment representing a portion of the audio signal occurring in one of a succession of time intervals;
- means for detecting for each segment the presence of a fundamental frequency;
- means responsive to the detecting means for determining the voicing probability for each segment by computing a ratio between voiced and unvoiced components of the audio signal, the determining means comprising:
  - means for windowing each segment of the audio signal;
  - means for computing the spectrum of the windowed segment;
  - means for computing correlation coefficients of each segment using at least the spectrum;
  - means for estimating a voicing threshold for each segment, comprising:
  - means for dividing the spectrum into a plurality of non-linear bands, wherein the low bands of the spectrum have a higher resolution than the high bands of the spectrum;
  - means for evaluating at least one voice measurement for each of the plurality of bands; and
  - means for determining the voicing threshold for each segment using the at least one voice measurement; and
  - means for comparing the correlation coefficients with the voicing threshold for each segment;
- means for separating the signal in each segment into a voiced portion and an unvoiced portion on the basis of the voicing probability, wherein the voiced portion of the signal occupies the low end of the spectrum and the unvoiced portion of the signal occupies the high end of the spectrum for each segment; and
- means for separately encoding the voiced portion and the unvoiced portion of the audio signal.

2. The system of claim 1, wherein the audio signal is a speech signal and the means for determining the voicing probability further comprises means for refining the fundamental frequency of each segment using at least the spectrum of the windowed segment.

3. The system of claim 1, wherein the means for computing the spectrum of the windowed segment comprises means for performing a Fast Fourier Transform (FFT) of the windowed segment.

4. The system of claim 1, wherein the means for estimating the voicing threshold for each segment further comprises:
- means for computing a low band energy of the spectrum;
- means for computing an energy ratio between the energy of the high and low bands of the spectrum of a current segment and a previous segment; and
- a multi-layer neural network classifier for receiving the at least one voice measurement, the low band energy, and the energy ratio, wherein the at least one voice measurement includes normalized correlation coefficients in the frequency domain.

5. The system of claim 1, further comprising means for spectrally estimating the audio signal comprising:
- means for calculating a complex spectrum for each segment by using a window based on the fundamental frequency;
- means for spectrally modeling each segment using at least the complex spectrum, the fundamental frequency, and the voicing probability to obtain line spectral frequencies (LSF) coefficients and a signal gain of each segment.

6. The system of claim 5, wherein the means for calculating the complex spectrum comprises means for applying a Fast Fourier Transform to the windowed segment.

7. A system for processing an audio signal comprising:
- means for dividing the signal into segments, each segment representing a portion of the audio signal in one of a succession of time intervals;
- means for detecting for each segment the presence of a fundamental frequency;
- means responsive to the detecting means for determining the voicing probability for each segment by computing a ratio between voiced and unvoiced components of the audio signal, the determining means comprising:
  - means for windowing each segment of the audio signal;
  - means for computing the spectrum of the windowed segment;
  - means for computing correlation coefficients of each segment using at least the spectrum;
  - means for estimating a voicing threshold for each segment, comprising:
  - means for dividing the spectrum into a plurality of non-linear bands, wherein the low bands of the spectrum have a higher resolution than the high bands of the spectrum;
  - means for evaluating at least one voice measurement for each of the plurality of bands; and
  - means for determining the voicing threshold for each segment using the at least one voice measurement; and
- means for comparing the correlation coefficients with the voiding threshold for each segment;
- means for calculating a complex spectrum for each segment by using a window based on the fundamental frequency;
- means for spectrally modeling each segment using at least the complex spectrum, the fundamental frequency, and the voicing probability to obtain line spectral frequencies (LSF) coefficients and a signal gain of each segment;
- means for separating the signal in each segment into a voiced portion and an unvoiced portion on the basis of the voicing probability, wherein the voiced portion of the signal occupies the low end of the spectrum and the unvoiced portion of the signal occupies the high end of the spectrum for each segment; and means for separately encoding the voiced portion and the unvoiced portion of the audio signal, wherein the means for separately encoding further includes means for computing LPC coefficients for a speech segment and means for transforming LPC coefficients into line spectral frequencies (LSF) coefficients corresponding to the LPC coefficients.

8. The system of claim 7, wherein the audio signal is a speech signal and the means for determining the voicing probability comprises means for refining the fundamental frequency of each segment using at least the spectrum of the windowed segment.

9. The system of claim 7, wherein the means for computing the spectrum of the windowed segment comprises means for performing a Fast Fourier Transform (FFT) of the windowed segment.

10. The system of claim 7, wherein the means for estimating the voicing threshold for each segment further comprises:

means for computing a low band energy of the spectrum;

means for computing an energy ratio between the energy of the high and low bands of the spectrum of a current segment and a previous segment; and a multi-layer neural network classifier for receiving the the at least one voice measurement, the low band energy, and the energy ratio, wherein the at least one voice measurement includes normalized correlation coefficients in the frequency domain.

11. The system of claim 7, wherein the means for calculating the complex spectrum comprises means for applying a Fast Fourier Transform to the windowed segment.

12. A system for processing an audio signal having a number of frames, the system comprising:

an encoder comprising:

first means for determining for each frame a ratio between voiced and unvoiced components of the audio signal on the basis of the fundamental frequency of each frame, the ratio being defined as a voicing probability, the means for determining the voicing probability comprising:

means for windowing each frame of the input signal;

means for computing the spectrum of the windowed frame;

means for computing correlation coefficients of each frame using at least the spectrum; and means for comparing the correlation coefficients with a voicing threshold for each segment;

second means for determining at least a pitch period, a mid-frame pitch period, and a mid-frame voicing probability of the audio signal; and means for quantizing at least the pitch period, the voicing probability, the mid-frame pitch period, and the mid-frame voicing probability.

13. The system of claim 12, wherein further comprising means for high-pass filtering the audio signal and buffering the audio signal into the number of frames.

14. The system of claim 12, wherein the encoder further comprises spectral estimation means for computing an estimate of the power spectrum of the audio signal using a pitch adaptive window.

15. The system of claim 14, wherein the length of the pitch adaptive window is based on the fundamental frequency of the audio signal.

16. The system of claim 12, further comprising:

means for calculating a complex spectrum for each segment by using a window based on the fundamental frequency; and means for spectrally modeling each segment using at least the complex spectrum, the fundamental frequency, and the voicing probability to obtain line spectral frequencies (LSF) coefficients and a signal gain of each segment.

17. The system of claim 16, wherein the means for calculating the complex spectrum comprises means for applying a Fast Fourier Transform to the windowed segment.

18. The system of claim 12, further comprising means for estimating the voicing threshold for each segment comprising:

means for dividing the spectrum into a plurality of non-linear bands, where the low bands of the spectrum have a higher resolution than the high bands of the spectrum;

means for evaluating at least one voice measurement for each of the plurality of bands, where the at least one voice measurement is the normalized correlation coefficients calculated in the frequency domain;

means for computing the low band energy of the spectrum;

means for computing an energy ratio between the energy of the high and low bands of the spectrum of a current segment and a previous segment; and means for receiving the normalized correlation coefficients of the low bands, the low band energy and the energy ratio.

19. The system of claim 18, wherein the means for receiving is a multi-layer neural network classifier.

20. The system of claim 19, wherein the voicing probability is zero if an output from the means for receiving is less than a predetermined threshold for a predetermined number of frames.

21. The system of claim 12, further comprising a decoder comprising:

means for unquantizing at least the pitch period, the voicing probability, the mid-frame pitch period, and/or the mid-frame voicing probability and providing at least one output; and means for analyzing the at least one output to produce a synthetic speech signal corresponding to the input audio signal.

22. The system of claim 21, wherein the means for unquantizing comprises:

means for producing a spectral magnitude envelope and a minimum phase envelope using at least the unquantized pitch period, the unquantized voicing probability, the unquantized mid-frame pitch period, and/or the unquantized mid-frame voicing probability;

means for interpolating and outputting the spectral magnitude envelope and the minimum phase envelope to the means for analyzing;

means for estimating the signal-to-noise ratio of the audio signal using the at least the unquantized pitch period, the unquantized voicing probability, the unquantized mid-frame pitch period, and/or the unquantized mid-frame voicing probability; and means for generating at least one control parameter using at least the signal-to-noise ratio and for outputting the at least one control parameter to the means for analyzing.

23. The system of claim 21, wherein the means for analyzing comprises:

first means for processing the at least one output to produce a time-domain signal; and second means for processing the time-domain signal to produce the synthetic speech signal corresponding to the audio signal.

24. The system of claim 23, wherein the first means for processing the at least one output to produce the time-domain signal comprises:

means for filtering a spectral magnitude envelope, wherein the spectral magnitude envelope is outputted by the means for unquantizing;

means for calculating frequencies and amplitudes using at least the filtered spectral magnitude envelope;

means for calculating sine-wave phases using at least the calculated frequencies; and means for calculating a sum of sinusoids using at least the calculated frequencies and amplitudes and the sine-wave phases to produce the time-domain signal.

25. A system for processing an audio signal having a number of frames, the system comprising:

an encoder comprising:

means for determining for each frame a ratio between voiced and unvoiced components of the audio signal on the basis of the fundamental frequency of each frame, the ratio being defined as a voicing probability;

means for calculating a complex spectrum for each segment by using a window based on the fundamental frequency;

means for spectrally modeling each segment using at least the complex spectrum, the fundamental frequency, and the voicing probability to obtain line spectral frequencies (LSF) coefficients and a signal gain of each segment;

means for determining at least a pitch period, a mid-frame pitch period, and a mid-frame voicing probability of the audio signal; and means for quantizing at least the pitch period, the voicing probability, the mid-frame pitch period, and the mid-frame voicing probability.

26. The system of claim 25, further comprising means for high-pass filtering the audio signal and buffering the audio signal into the number of frames.

27. The system of claim 25, wherein the encoder further comprises spectral estimation means for computing an estimate of the power spectrum of the audio signal using a pitch adaptive window.

28. The system of claim 27, wherein the length of the pitch adaptive window is based on the fundamental frequency of the audio signal.

29. The system of claim 25, further comprising means for estimating the voicing threshold for each segment comprising:

means for dividing the spectrum into a plurality of non-linear bands, where the low bands of the spectrum have a higher resolution than the high bands of the spectrum;

means for evaluating at least one voice measurement for each of the plurality of bands, where the at least one voice measurement is the normalized correlation coefficients calculated in the frequency domain;

means for computing the low band energy of the spectrum;

means for computing an energy ratio between the energy of the high and low bands of the spectrum of a current segment and a previous segment; and means for receiving the normalized correlation coefficients of the low bands, the low band energy and the energy ratio.

30. The system of claim 29, wherein the means for receiving is a multi-layer neural network classifier.

31. The system of claim 30, wherein the voicing probability is zero if an output from the means for receiving is less than a predetermined threshold for a predetermined number of frames.

32. The system of claim 25, wherein the means for determining the voicing probability comprises:

means for windowing each frame of the input signal;

means for computing the spectrum of the windowed frame;

means for computing correlation coefficients of each frame using at least the spectrum; and means for comparing the correlation coefficients with a voicing threshold for each segment.

33. The system of claim 25, wherein the means for calculating the complex spectrum comprises means for applying a Fast Fourier Transform to the windowed segment.

34. The system of claim 25, further comprising a decoder comprising:

means for unquantizing at least the pitch period, the voicing probability, the mid-frame pitch period, and/or the mid-frame voicing probability and providing at least one output; and means for analyzing the at least one output to produce a synthetic speech signal corresponding to the input audio signal.

35. The system of claim 34, wherein the means for unquantizing comprises:

means for producing a spectral magnitude envelope and a minimum phase envelope using at least the unquantized pitch period, the unquantized voicing probability, the unquentized mid-frame pitch period, and/or the unquantized mid-frame voicing probability;

means for interpolating and outputting the spectral magnitude envelope and the minimum phase envelope to the means for analyzing;

means for estimating the signal-to-noise ratio of the audio signal using the at least the unquantized pitch period, the unquantized voicing probability, the unquantized mid-frame pitch period, and/or the unquantized mid-frame voicing probability; and means for generating at least one control parameter using at least the signal-to-noise ratio and for outputting the at least one control parameter to the means for analyzing.

36. The system of claim 34, wherein the means for analyzing comprises:

first means for processing the at least one output to produce a time-domain signal; and second means for processing the time-domain signal to produce the synthetic speech signal corresponding to the audio signal.

37. The system of claim 36, wherein the first means for processing the at least one output to produce the time-domain signal comprises:

means for filtering a spectral magnitude envelope, wherein the spectral magnitude envelope is outputted by the means for unquantizing;

means for calculating frequencies and amplitudes using at least the filtered spectral magnitude envelope;

means for calculating sine-wave phases using at least the calculated frequencies; and means for calculating a sum of sinusoids using at least the calculated frequencies and amplitudes and the sine-wave phases to produce the time-domain signal.

* * * * *